T. J. MURPHY.
RECTIFIER OF ELECTRIC CURRENTS.
APPLICATION FILED FEB. 2, 1911.

1,180,414.

Patented Apr. 25, 1916.
3 SHEETS—SHEET 1.

WITNESSES

INVENTOR
Thomas J. Murphy
BY
ATTORNEY

T. J. MURPHY.
RECTIFIER OF ELECTRIC CURRENTS.
APPLICATION FILED FEB. 2, 1911.

1,180,414.

Patented Apr. 25, 1916.
3 SHEETS—SHEET 3.

WITNESSES:
David J. Walsh
Guy W. Hodges

INVENTOR
Thomas J. Murphy
BY
F. F. Crampton
ATTORNEY

UNITED STATES PATENT OFFICE.

THOMAS J. MURPHY, OF ROCHESTER, NEW YORK, ASSIGNOR OF ONE-HALF TO JAMES P. B. DUFFY, OF ROCHESTER, NEW YORK.

RECTIFIER OF ELECTRIC CURRENTS.

1,180,414. Specification of Letters Patent. Patented Apr. 25, 1916.

Application filed February 2, 1911. Serial No. 606,152.

*To all whom it may concern:*

Be it known that I, THOMAS J. MURPHY, a subject of the King of Great Britain, and a resident of the city of Rochester, State of New York, have invented new and useful Improvements in Rectifiers of Electric Currents, of which the following is a specification.

My invention relates to apparatus for rectifying electric currents and it has for its object particularly the production of a substantially uniform unidirectional current from an alternating current. It is particularly useful in connection with circuits having a considerable impedance. It is also of advantage for producing a changing unidirectional continuous current which may in some circuits assist in the performance of functions of adjustment and regulations such as in arc light circuits.

The invention may be contained in many forms of apparatus and constructions and arrangements. I shall describe hereinafter one form of invention to illustrate its operativeness. The arrangement shown however may be greatly varied by those skilled in the art without departing from the spirit of the invention.

Figure 5:
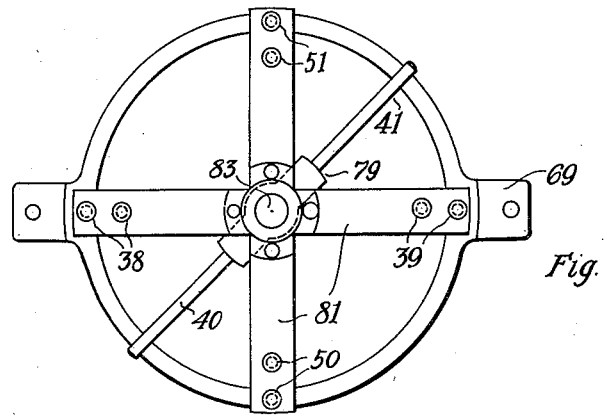
Figure 1:
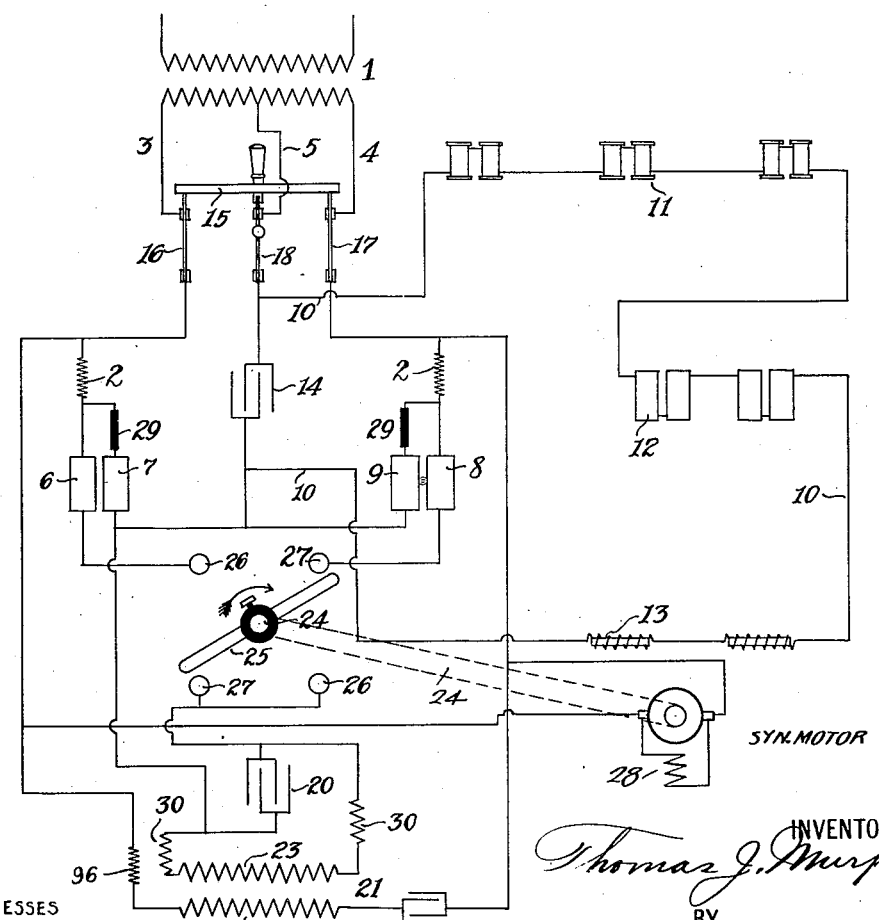
Figure 2:
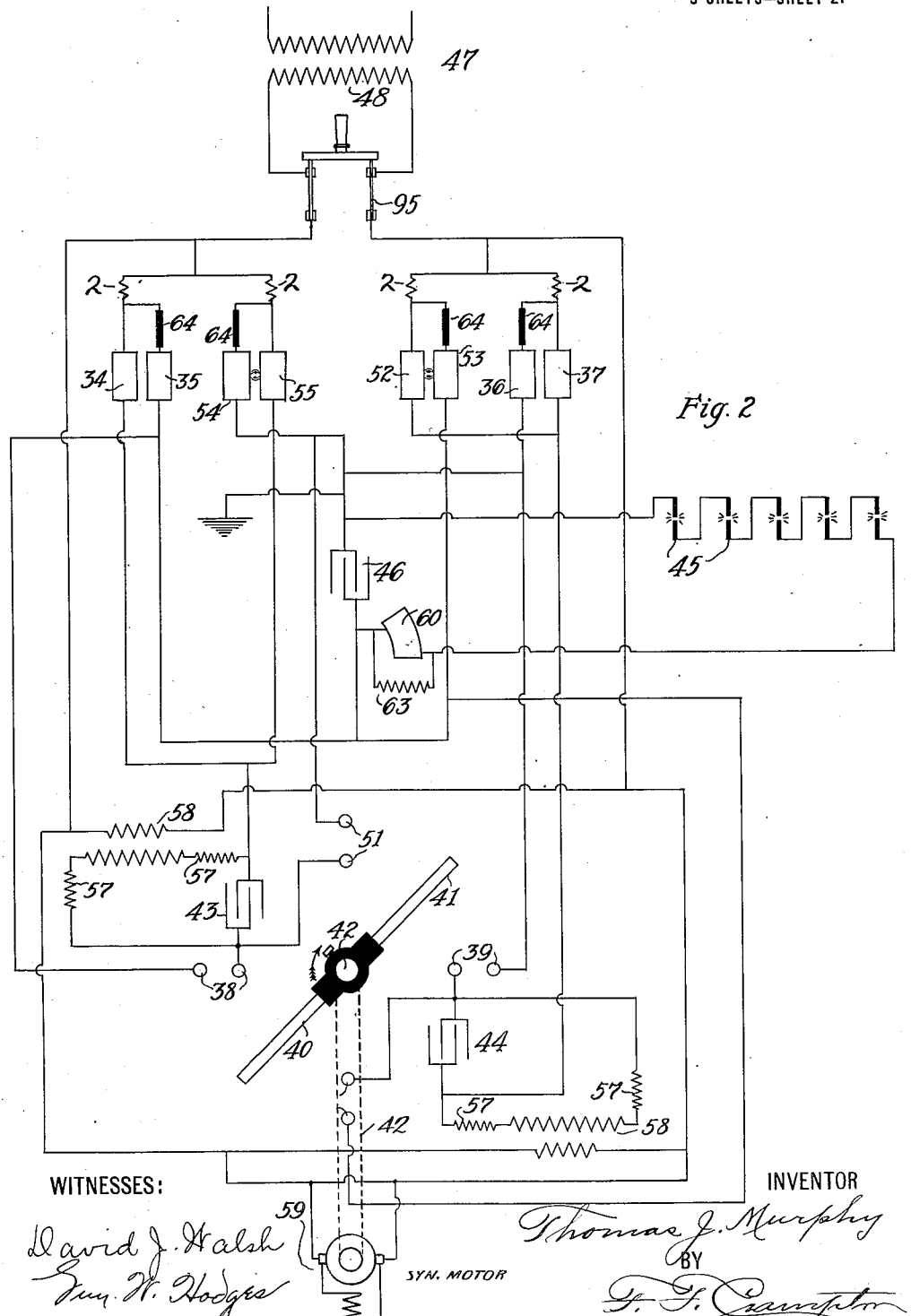
Figure 3:
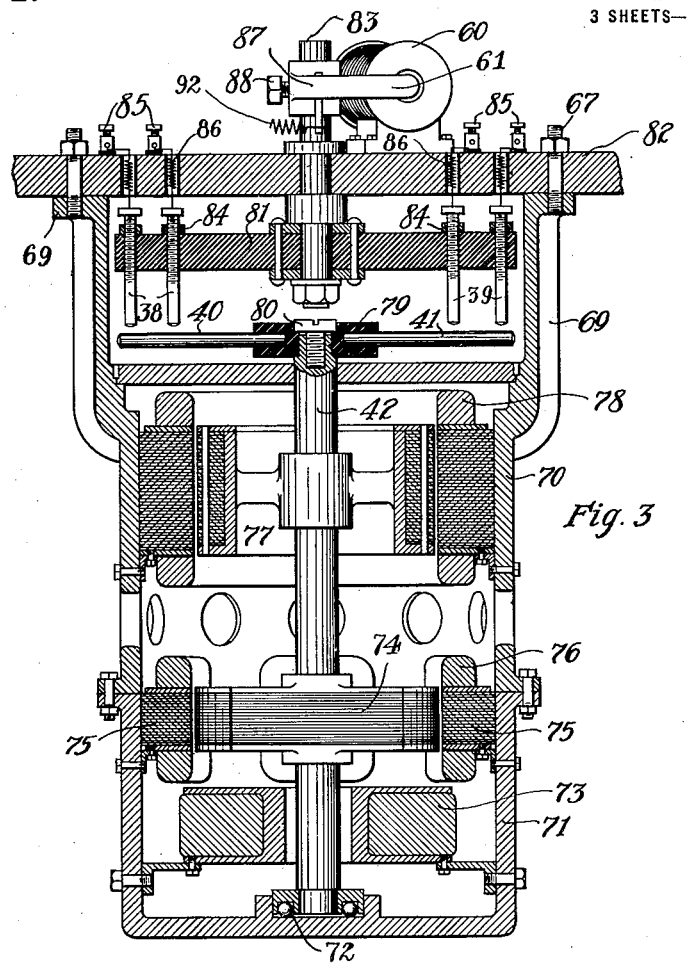
Figure 4:
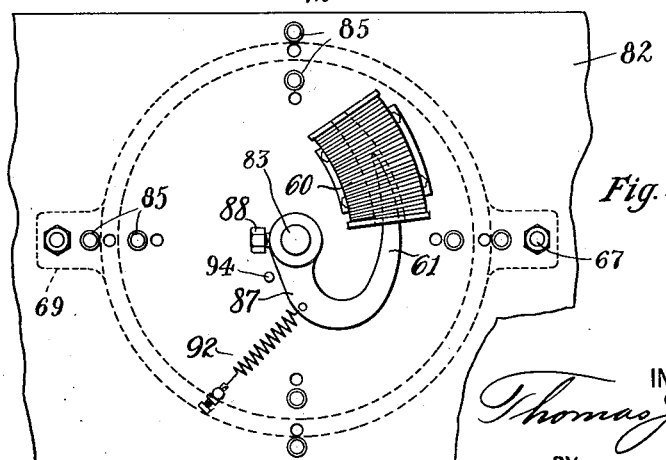

Referring to the drawings Figure 1 is a diagram showing the invention as applied to an electric circuit, having considerable impedance. Fig. 2 is a diagram showing the invention as applied to an arc-light circuit. Figs. 3, 4 and 5 illustrate a device for regulating the current in the circuit shown diagrammatically in Fig. 2. Fig. 3 is a side view partly in section; Fig. 4 is a top view and Fig. 5 illustrates a detail of the device.

1, Fig. 1, is a line transformer that is used to represent a source of alternating current.

3 and 4 are the terminals of the source 1 of the current of the system; 5 is the terminal connected to the return line of the system. Electrodes 6, 7 and 8, 9 are connected in the circuit of the source. The circuit is completed through the return line 10 which receives the operating current. In the system shown it contains the coils 11, 12 and 13 which may be used to conventionally represent electric devices of any character having self induction. The circuit 10 is shunted by the condenser 14. The circuits are completed by means of the switch 15 having a blade 16 and 17 connected in the lines leading to the outside terminals of the source and the movable blade 18 connected in the return line.

A means is provided for completing the circuit between the electrodes 6 and 7 and 8 and 9 alternately as the current changes in the sign of its potential. In the form of the invention illustrated the electrodes are connected to a circuit having a source of high potential current. A means is provided for periodically starting an arc across the electrodes thereby reducing the resistance and permitting the current from the source 1 to flow through the circuit. The circuits of each pair of electrodes are completed alternately according to the direction of the current and consequently the current passes alternately through each pair of electrodes, but always in the same direction in each pair and always in the same direction in the return circuit. To start the arc a spark is produced between one pair of electrodes when the current from the transformer is in one direction and across the other pair of electrodes when the current is in the opposite direction. In the form of the invention illustrated in the drawing I have shown a condenser 20 which is charged by means of the transformer 21 having the primary 22 connected to the terminals of the source 1 and the secondary 23 connected to the condenser 20. The condenser is connected to the electrodes and to a means which periodically operates to permit the spark produced in the discharge of the condenser to pass across the electrodes. This may be accomplished by means of a rotating arm 25 which passes in the vicinity of the points or terminals 26 and 27. The arm though it passes in the vicinity of the terminals does not make contact with the points 26 and 27. Thereby a triple gap is formed in the high potential circuit which produces an oscillatory discharge across the electrodes. The arm is rotated in unison with the changes of the current in the main line it being operated by a synchronous motor connected to the main line. I have indicated such an arrangement by means of the coil 28 which may be used to represent the stator coil of the synchronous motor in a conventional way. The arm 25 is adjustable on the shaft 24 so that, if the current of the main circuit is an alternating current the sparking between the arm 25 and the points and between the electrodes may be made to occur at times in the current wave as may be desired. The average potential of the current and the quantity of the current may thus be regulated. A condenser 95 and a resistance 96 is located in the circuit of the primary to cause the potential wave of the sparking current to lead in advance of the working current from the transformer 1. The condenser and resistance may be made variable if desired to obtain varying results.

The line containing considerable impedance causes the current to lag and causes an elapse of time before the current can be built up in the line and allow it to flow after the arcs between the electrodes are formed. Meantime the condenser is charged while at the same time current establishes the lines of force in the magnetic devices. When the rate of flow of the current decreases the magnetic lines of force in the several impedance devices will return the extra current to the circuit and as the potential decreases the condenser will also gradually discharge its electricity into the line. But before the current returns to zero the arm 25 again reaches a point in the vicinity of a pair of sparking points connected with another pair of electrodes and the potential of the main line circuit will again rise and the current will again establish lines of force and the condenser will receive a new charge of electricity which will in turn be gradually returned to the line. The condenser and the inductance in the line thus coöperate with each other and the rectifier to produce a substantially uniform, unidirectional current in the circuit. This, however, depends on the capacity of the condenser. The current may be allowed to approach the zero line if the capacity of the condenser is made smaller.

Very high resistances 29 may be connected in parallel with the electrodes to prevent sparking across the electrodes except as may be directed or controlled by the rotating rod. Choke coils 30 may be used to protect the secondary or subsidiary circuit. Choke coils 2 are located in series with the electrodes 6, 7, 8 and 9 to prevent any undue fluctuations in the circuit.

Any number of the electrodes may be connected in the system. They may be arranged in multiple or in series and any numbers of pairs of electrodes may be used to produce the rectified current. The connections between the electrodes and the controlling devices may also be greatly varied to accomplish different results.

In the modification shown in Fig. 2 the entire potential of the line except that consumed in maintaining the arcs is used to operate upon the translating devices. Two pairs of electrodes are connected to each side of the line. The current is first allowed to flow through one pair of electrodes on each side of the line and then as the potential of the line changes sign, through another pair of electrodes on each side of the line. The electrodes 34 and 35 and 36 and 37 are controlled by the sparking points 38 and 39. Two arms 40 and 41 are mounted on a rotating shaft 42 but insulated therefrom and from each other. They are adapted to come into the vicinity of the pairs of sparking points 38 and 39 at the same time. The electrodes 34 and 37 are connected to the condensers 43 and 44. The arms 40 and 41, through the sparking points, complete the circuit of the condensers 43 and 44 to the electrodes 35 and 36 whereupon the condensers may be discharged across the electrodes, 34, 35 and 36 and 37 and the arcs started thus completing both sides of the circuit at the same time. A current may then pass through the electrodes and the translating devices 45 and at the same time charge the condenser 46. The current then flows from the transformer 47 to the electrodes 34 and 35 the condenser 46 and the translating devices 45 and returns through the electrodes 36 and 37 and to the line transformer 47. A current continues to flow until its potential is substantially equal to that of the counter-electro-motive forces produced in the circuit whereupon it ceases to flow.

The shaft 42 is connected to a synchronous motor which is adapted to keep the arms 40 and 41 moving in unison with the changes of the current of the main line. The coil 59 represents in a conventional way the stator of such a motor. As the current potential decreases and changes its sign and again increases in potential of opposite character the arms 40 and 41 approach and pass the sparking points 50 and 51. The electrodes 52 and 55 are connected to the condensers 44 and 43. The arms 40 and 41 complete the circuit of the condensers 43 and 44 through the sparking points 50 and 51 to the electrodes 53 and 54. The condensers are thus discharged across the electrodes and arcs are thus started. A current may thus flow from the line transformer 47 to the electrodes 52, 53 and the translating devices 45 in the same direction as before and return through the electrodes 54, 55 to the line transformer 47. A unidirectional current is thus produced in the circuits of the translating devices 45. If the translating devices have considerable impedance the condenser 46 will coöperate to produce a continuous though variable current and unidirectional in character. This arrangement of devices is especially applicable to arc lights which require a unidirectional current. It moreover has the advantage of producing a slightly fluctuating though continuous and unidirectional current thereby keeping the regulating apparatus of the lamp in continuous operation and keeping the light substantially uniform in character. The current of the line may be regulated if desired by adjusting the points 38, 39 and 50 and 51 relative to the moving arms 40 and 41. If the current increases too much the spark may be produced and the arc started lower down on the declination of each wave and vice versa. If desired, however, the potential may be regulated by changing the point at which the arcs are started while each wave is increasing in potential. This operation may be accomplished automatically by means of a magnet located in the circuit of the current to be controlled. I have shown a solenoid 60 located in the circuit of the arc lights. The core of the solenoid 60 may be connected to a frame supporting the sparking points which may be slightly rotated by the operation of the current passing through the arc lamps so as to vary the point in the wave at which the arcs will be started across the electrodes of the electricity rectifier.

The means for adjusting the terminals 38, 39 and 50 and 51 relative to the arms 40 and 41 is shown in Figs. 3, 4 and 5. The arms 40 and 41 are connected to the shaft 42 which is stepped in the casing 71 and supported on the roller bearing 72. A direct current coil 73 is located around the lower part of the shaft 42 and is adapted to cause the magnetic lines of force to pass through the shaft 42 and the casing 71. A two pole armature 74 is mounted on a shaft 41 and is adapted to rotate between the four poles 75. The stator 76 consists of coils surrounding the poles 75 and is adapted to change the magnetic flux produced by the direct current coil 73 as the current of the line changes. This causes the shaft and arms 40, 41 to rotate in unison with the changes of the current of the stator represented conventionally by the coil 59 in Fig. 2. An induction motor having the armature 77 also operates upon the shaft 42. The armature 77 is of the usual squirrel-cage type and is inductively operated upon by the stator 78 having a split phase coil. The arms 40 and 41 are secured in an insulating collar or spider 79 which is secured to the shaft 42 by means of the screw 80. The sparking points are located in a frame 81 which is pivoted to the supporting base. They extend through the frame 81 and may be adjusted in the frame relative to the rotating arms 40 and 41 by means of the nuts 84. The sparking points are connected to suitable binding posts 85 through flexible conductors 86 which pass through the base 82 and permit the frame 81 to be rotated a short distance on the shaft 83. The solenoid 60 is provided with a movable core 61 which is connected to or forms a part of the arm 87. The arm 87 is adjustably connected to the shaft 83 by means of the bolt 88. When an approximate adjustment is made by means of the bolt 88, the relative position of the sparking points may be automatically changed by the current passing through the solenoid 60 which causes the sparking points to rotate on the shaft 83 according to the fluctuations of the current produced in the circuit of the arc lights 45 and produce readjustment of the parts. The arm 87 is connected to a spring 92 which causes a return of the arm 87.

The casing 71 may be connected to the casing 70 which is attached to a suitable supporting base 82 by means of the legs 69. The casing 70 may be made of brass while the casing 71 is made of iron. Bolts 67 are adapted to secure the casings containing the motors to the supporting base.

The condensers 43, and 44 shown in Fig. 2 may be charged by the transformers 58, 58 which are adapted to raise the potential produced by the transformer 47 to a higher potential. Choke coils 57 may be used to protect the secondary circuits as described in connection with the system shown in Fig. 1. Also the solenoid 60 may be located in shunt with the coil 63 in order that but a fraction of the current passing through the arc lights 45 may be used to operate the solenoid. In order to prevent a discharge taking place across the electrodes during periods of reactionary currents, high resistance bodies 64 may be connected in shunt with the electrodes.

Constructions or arrangements of parts containing the invention are of many forms. The arrangement illustrated and described is selected for the purpose of setting forth one embodiment of the invention to show its operation and the practicability of the invention. The devices and the connections shown may be greatly changed and modified and yet such changes will still contain the essence of the invention. The invention consists in features described and shown in the drawings and set forth in the claims and such features that may be suggested by the description and the illustrations and such modifications thereof that are covered by the claims.

What I claim is new and desire to secure by Letters Patent is as follows:

1. In an apparatus for producing a continuous uni-directional current, the combination of a self induction device located in the circuit, a condenser located in shunt with the said circuit, and a means for regulating the potential of the rectified current.

2. In an apparatus for producing a continuous uni-directional current, the combination of a self induction device located in the circuit, a condenser located in shunt with the said circuit and means for automatically regulating the rectified current.

3. In a rectifier the combination of a source of alternating current, two pairs of electrodes connected to each side of the said source and means for starting an arc through a pair of electrodes on each side of the said source when the current is all one sign and through the other one of the pairs of electrodes on the other side of the said source when the current is of opposite sign.

4. In a rectifier of electric currents the combination of a source of alternating current, a condenser, means for charging the said condenser, a pair of electrodes located in the circuit of the said source and the said condenser, spark terminals located in the circuit of the said condenser and the said electrodes and means for automatically regulating the said spark terminals.

5. In a rectifier of electric currents the combination of a source of alternating current, two pairs of electrodes connected to the said source, a condenser and a source of high potential current connected to the said electrodes and means for automatically regulating the discharge of the condenser across the said electrodes alternately.

6. In a rectifier of electric currents the combination of a source of alternating current, two pairs of electrodes connected to the said source, a condenser and a source of high potential current connected to the said electrodes, sparking terminals located in the circuit of the said condenser and each pair of electrodes and an automatic means for regulating the position of the said spark terminals.

7. In a rectifier of electric currents, the combination of a conductor, two pairs of terminals, means for rotating the said conductor in the vicinity of the said terminals, an electromagnet for rotating the said terminals with respect to the said rotating conductor, the said magnet connected in the circuit of the rectified current.

8. In a rectifier of electric currents, the combination of a conductor, a pair of terminals, means for rotating the said conductor in the vicinity of the said terminals, an electromagnet for rotating the said terminals with respect to the said rotating conductor, the said magnet connected in the circuit of the rectified current.

THOMAS J. MURPHY.

Witnesses:
JAMES P. B. DUFFY,
MARY B. DICKENS.